(12) United States Patent
Eiden et al.

(10) Patent No.: US 6,434,850 B1
(45) Date of Patent: Aug. 20, 2002

(54) MEASURING INSTRUMENT

(75) Inventors: Michael Eiden, Gusenburg; Burkhard Jungblut, Kell am See, both of (DE)

(73) Assignee: Krupp Bilstein GmbH, Ennepetal (DE)

( * ) Notice: Subject to any disclaimer, the term of this patent is extended or adjusted under 35 U.S.C. 154(b) by 7 days.

(21) Appl. No.: 09/694,753

(22) Filed: Oct. 23, 2000

(30) Foreign Application Priority Data

Dec. 18, 1999 (DE) .......................... 199 61 232

(51) Int. Cl.[7] .............................. G01B 5/00; G01B 3/56
(52) U.S. Cl. .............................. 33/542; 33/531; 33/534
(58) Field of Search .......................... 33/531, 532, 534, 33/542, 544, 544.2, 544.3, 544.4, 832, 833, 836

(56) References Cited

U.S. PATENT DOCUMENTS

| | | | | |
|---|---|---|---|---|
| 79,032 A | * | 6/1868 | Tierney | 33/531 |
| 129,349 A | * | 7/1872 | Kellogg | 33/532 |
| 777,606 A | * | 12/1904 | Creamer et al. | 33/532 |
| 1,664,535 A | * | 4/1928 | Bartholdy | 33/531 |
| 2,642,670 A | * | 6/1953 | Dow | 33/531 |
| 2,812,587 A | * | 11/1957 | Roussin | 33/544.2 |
| 2,975,524 A | * | 3/1961 | Field | 33/534 |
| 2,979,824 A | * | 4/1961 | Hymer | 33/531 |
| 3,116,560 A | * | 1/1964 | Matthews | 33/534 |
| 3,919,776 A | * | 11/1975 | Upton | 33/531 |
| 4,307,514 A | * | 12/1981 | Ange et al. | 33/544.2 |
| 5,479,721 A | * | 1/1996 | Wickander | 33/531 |
| 5,714,686 A | * | 2/1998 | Penjaska | 33/536 |

FOREIGN PATENT DOCUMENTS

| | | | | |
|---|---|---|---|---|
| GB | 2056069 A | * | 3/1979 | 33/532 |
| JP | 02025701 A | * | 1/1990 | 33/542 |
| JP | 04086502 A | * | 3/1992 | 33/542 |

* cited by examiner

Primary Examiner—Diego Gutierrez
Assistant Examiner—Mirellys Jagan
(74) Attorney, Agent, or Firm—Max Fogiel

(57) ABSTRACT

An instrument for measuring the apical angle of a countersink (3). A jig (5) positions a probe (8) with preferably three branches (11) that rest against the inner surface of the countersink. A contact lever (12) pivots on at least one branch, and rests axially inside the countersink. A dial (13) communicates with the contact lever by way of a sensor (14). The sensor rests against the contact lever remote from the articulation (15) between the lever and the branches.

5 Claims, 2 Drawing Sheets

MEASURING INSTRUMENT

BACKGROUND OF THE INVENTION

The present invention concerns an instrument for measuring the apical angle of a countersink.

The apical angles of countersinks are usually measured in accordance with the mathematics of conical sections. This method, however, is imprecise and depends almost entirely on the skill of whoever is doing the measurement. Furthermore, it is impossible to determine tolerances accurately.

When precise measurement is necessary, three-dimensional machine tools are all that is available at the current state of the art. Constant inspection of the work, however, is labor-intensive and expensive.

SUMMARY OF THE INVENTION

The object of the present invention is accordingly an instrument for measuring apical angles that can accurately determine and allow display of the tolerances of any given countersinks. The instrument is also intended to be both easy to use and inexpensive.

The particular advantage of the present invention is that such a simple instrument can so accurately measure the apical angle of a finished countersink and allow such a precise display of the results.

One embodiment of the present invention will now be specified with reference to the accompanying drawings, in which.

DESCRIPTION OF THE PREFERRED EMBODIMENT

Figure 1:
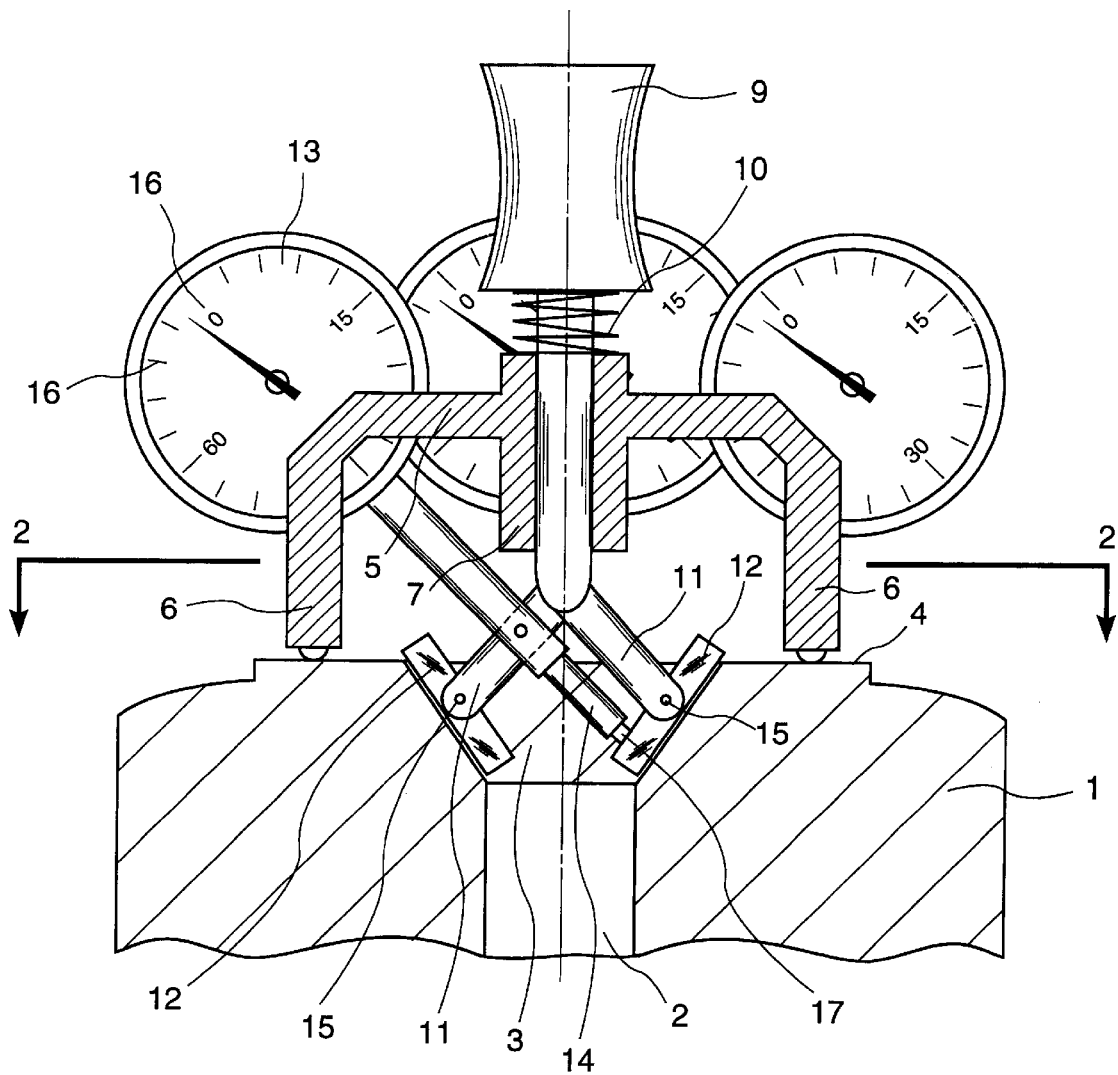
FIG. 1 is a section through work secured in a machine tool and provided with a countersink.
Figure 2:
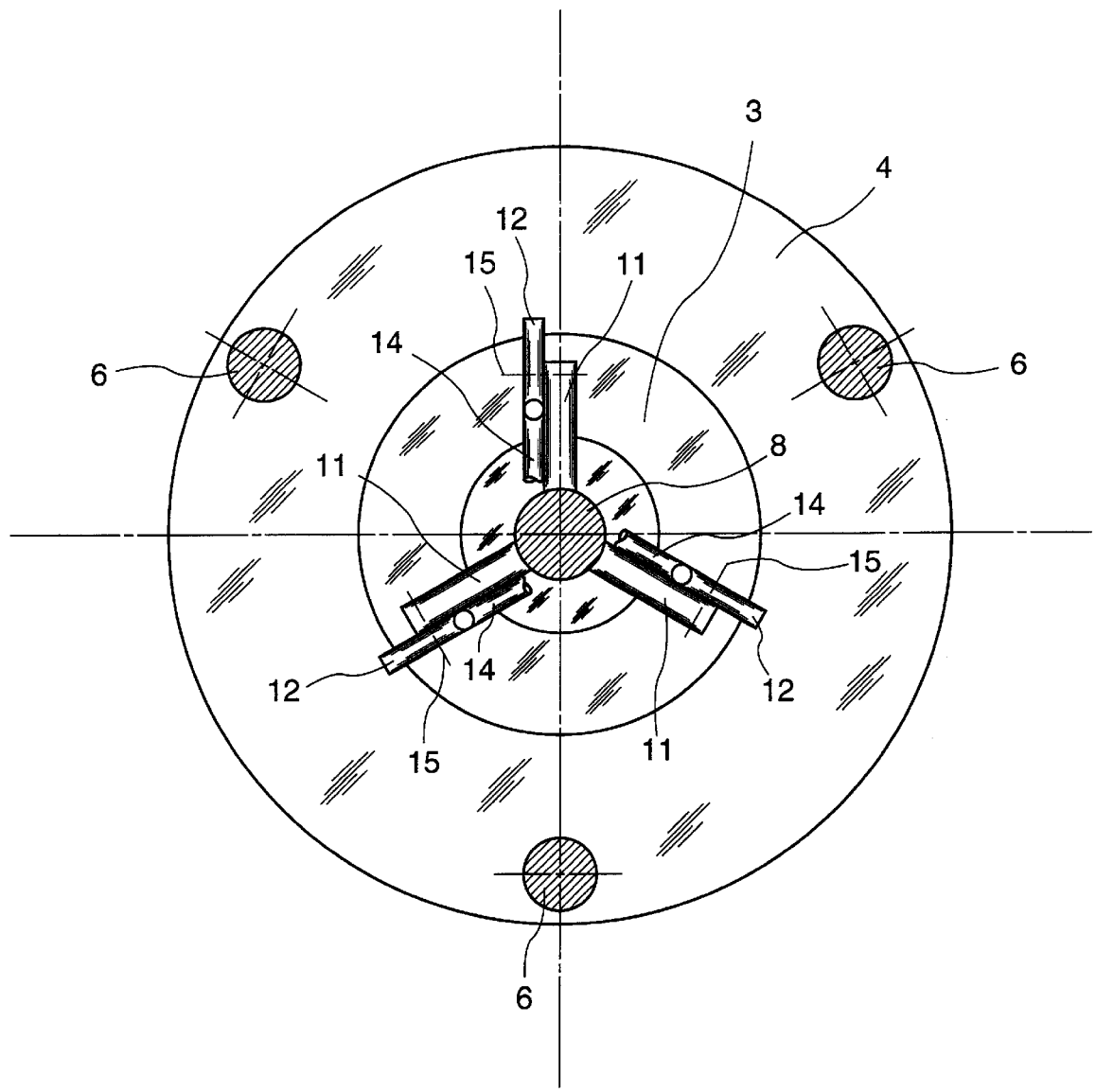
FIG. 2 is a section view taken along line 2—2 in FIG. 1.

Work 1 has a flat area 4 that has been provided with a bore 2 that expands at its outer end into a countersink 3.

An instrument for measuring the apical angle of countersink has been applied to flat area 4. The instrument includes a jig 5 with three legs 6 that support the instrument on flat area 4. Jig 5 is also provided with a tube 7 at the center and perpendicular to flat area 4. A forked probe 8 moves up and down inside tube 7. Secured to the upper end of probe 8 is a knob 9. A compression spring 10 maintains knob 9 and probe 8 along with it lifted away from jig 5.

The inner end of probe 8 is provided with outward-sloping branches 11. Pivoting on the end of each branch 11 is a contact lever 12. Contact levers 12 rest axially against the inner surface of the countersink while the latter's apical angle is being measured. Mounted on probe 8 or, as illustrated in the figure, on one of its branches 11 is a dial 13. Dial 13 rests remote from the points 15 of articulation between branches 11 and contact levers 12 against one of the latter. Dial 13 will accordingly provide different readings in accordance with the angle of the particular contact lever 12 that sensor 14 rests against.

How a reading is obtained will now be specified. The instrument is positioned with its legs 6 resting on flat area 4 and, to the greatest extent possible, with branches 11 resting against the inner surface of countersink 3. Knob 9 is forced down until the device assumes a position with all three legs evenly distributed over flat area 4 and with all branches 11 uniformly centered around countersink 3. A reading is obtained from dial 13, its graduations 16 indicating the range of tolerances for the apical angle being measured. The dial is provided with a master gage, usually indicating the maximal and minimal permissible tolerances. The graduations 16 are adjusted to the gage.

An instrument of this genus with just one dial will usually be adequate to the task, although it may be necessary to provide two or more dials to measure tolerances at various contact levers 12.

The point 17 where sensor 14 rests against contact lever 12 need not be near the center of the countersink as illustrated herein. It can just as well be at the other end of contact lever 12, in which event of course dial 13 must be in a different location.

What is claimed is:

1. An instrument for measuring an apical angle of a countersink with an inner surface comprising a jig for positioning a probe; three branches resting against the inner surface of the countersink; a contact lever pivoting on at least one of said three branches and resting axially inside the countersink; a sensor resting against said contact lever remote from an articulation between said lever and said branches, said branches being securely fixed to said probe, said contact lever only pivoting about said articulation, said branches and said contact lever centering said jig in said countersink, a dial being fixedly connected to said sensor, one of said three branches being connected to said probe and measurement of pivoting of said contact lever with respect to the associated branch providing a direct measurement of the apical angle of the countersink.

2. An instrument as defined in claim 1, wherein said countersink is machined into a workpiece having a surface with a flat area, said jig resting on said flat area.

3. An instrument as defined in claim 1, wherein said jig has at least three legs.

4. An instrument as defined in claim 1, including a plurality of contact levers pivoting on one of said branches.

5. An instrument for measuring an apical angle of a countersink with an inner surface comprising a jig for positioning a probe; three branches resting against the inner surface of the countersink; a plurality of contact levers, each lever pivoting on one of said three branches and resting axially inside the countersink; a sensor resting against each of said contact levers remote from an articulation between said levers and said branches; and a plurality of dials communicating with said contact levers through the sensors.

* * * * *